United States Patent [19]

Reinfelder

[11] Patent Number: 4,950,895
[45] Date of Patent: Aug. 21, 1990

[54] READ-OUT SYSTEM FOR A LUMINESCENT STORAGE SCREEN IN A X-RAY DIAGNOSTICS INSTALLATION

[75] Inventor: Hans-Erich Reinfelder, Erlangen, Fed. Rep. of Germany

[73] Assignee: Siemens Aktiengesellschaft, Berlin and Munich, Fed. Rep. of Germany

[21] Appl. No.: 397,899

[22] Filed: Aug. 24, 1989

[30] Foreign Application Priority Data

Sep. 14, 1988 [EP] European Pat. Off. ......... 88115026.2

[51] Int. Cl.$^5$ ............................................. G01N 23/04
[52] U.S. Cl. ............................... 250/327.2; 250/484.1
[58] Field of Search .......................... 250/327.2, 484.1

[56] References Cited

U.S. PATENT DOCUMENTS

| | | | |
|---|---|---|---|
| 4,703,177 | 10/1987 | Vieth | 250/327.2 |
| 4,730,220 | 3/1988 | Wagner | 358/280 |
| 4,816,679 | 3/1989 | Sunagawa et al. | 250/327.2 E |

FOREIGN PATENT DOCUMENTS

| | | |
|---|---|---|
| 0142865 | 5/1985 | European Pat. Off. . |
| 0144963 | 6/1985 | European Pat. Off. . |
| 2517346 | 1/1977 | Fed. Rep. of Germany . |
| 3035550 | 4/1982 | Fed. Rep. of Germany . |
| 56-120259 | 9/1981 | Japan . |

Primary Examiner—Carolyn E. Fields
Attorney, Agent, or Firm—Hill, Van Santen, Steadman & Simpson

[57] ABSTRACT

A read-out system for a luminescent storage screen, in which a latent x-ray image is stored, includes a read-out radiation source formed by a bank of light emitting diodes which are respectively individually coupled to picture elements to be scanned, such as those in a line of the storage screen. A control circuit is connected to the light emitting diodes which drives the diodes in coded fashion on the basis of a transformation, such as a Hadamard-Walsh transformation, so that a number of light emitting diodes are simultaneously energized. The total stimulated light emitted by a corresponding number of picture elements is detected, and is used to form coefficients for the transformation. A calculating stage is connected to the light detector, which calculates brightness values for each picture element from these coefficients by reverse transformation. The brightness values are displayed on an image reproduction system.

10 Claims, 1 Drawing Sheet

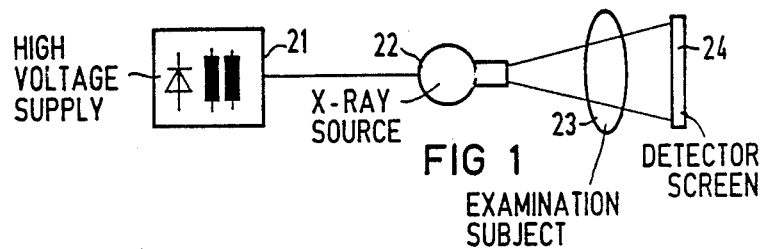
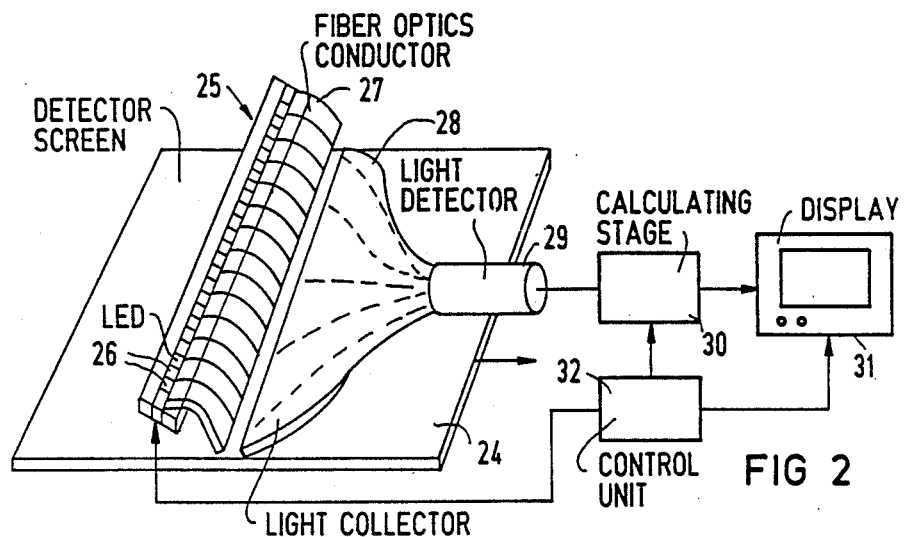
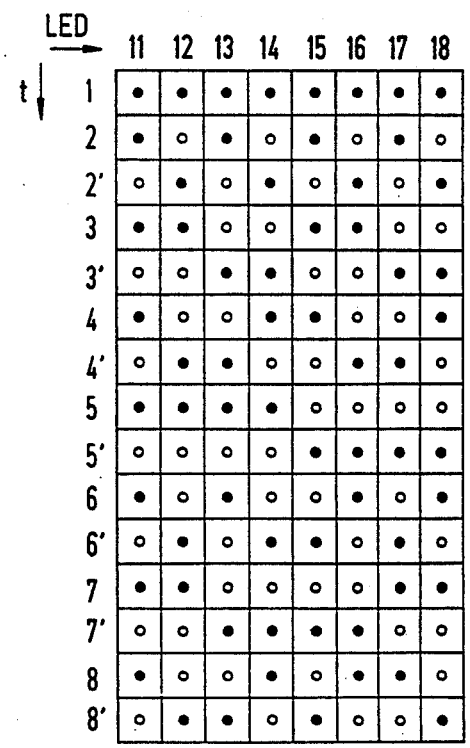

READ-OUT SYSTEM FOR A LUMINESCENT STORAGE SCREEN IN A X-RAY DIAGNOSTICS INSTALLATION

BACKGROUND OF THE INVENTION

1. Field of the Invention

The present invention is directed to a read-out system for a luminescent storage screen of an x-ray diagnostics installation wherein the screen is stimulated by read-out radiation, with the resulting emitted light from the screen being detected line-by-line.

2. Description of the Prior Art

Luminescent storage screens containing a stimulable phosphor are known for use in x-ray installations for storing a latent x-ray image. The stored image is read-out of such screens by causing the screen to luminesce by scanning with a stimulation radiation source, such as a bank of light emitting diodes arranged side-by-side. A detector acquires the light emitted by the storage screen, with the brightness values obtained thereby being used to construct and display a visual reproduction of the stored image.

It is also known to read-out such luminesce storage screens using a laser beam. The laser beam can be deflected in an appropriate scanning pattern with oscillating mirrors or a rotating polygonal mirror. During read-out, each picture element (pixel) is, in succession, exposed to an intense, focused laser beam, and the light emitted by the pixel due to this stimulation is acquired in a detector system. The detector system does not have topical resolution. A plurality of n picture elements are resolved per measuring line in a time T, so that only a small energy amount, of a maximum $E = P.T/n$ is used per picture element, given a known laser power P. The light quanta triggered during photostimulation are dependent on the energy amount E. Given barium-fluorine-halogenide phosphors which are generally standard, this value lies between 10 through 200 nWs. Given a prescribed scan time of a few microseconds per picture element, light powers of approximately 10 mW are necessary. Because of the necessary deflection of the scanning beam, such light powers can generally only be achieved by lasers.

A read-out system using light emitting diodes as the stimulating radiation source is disclosed in European Application 0 144 963, wherein four light emitting diodes are arranged side-by-side, which are individually energized in succession. The respective scan beams from the light emitting diodes are deflected by a mirror such that each light emitting diode sweeps a defined region of a scan line on the luminescent storage screen. One picture element of a scan line is excited at a time, and emits light due to the successive stimulation by the light emitting diodes. The generated light is conducted by a light conductor onto a detector, which generates an electrical signal corresponding to the brightness of the emitted light of the picture elements. The signal is then used is a known manner to construct a visual display of the stored x-ray image. The relatively complicated mechanics for deflecting the scanning beams in read-out systems of this type is a disadvantage. Moreover, each picture element is excited only once by the light emitting diodes, so that only a slight light yield is obtained per picture element.

Another read-out system is described in European Application 0 191 322, corresponding to U.S. Pat. No. 4,703,177. This patent discloses a system for scanning a stimulable phosphor foil with a line of individual radiation sources. The radiation sources are individually driven such that picture elements which do not lie next to each other are caused to luminesce. With a corresponding light conductor, the light emitted by the individual picture elements is forwarded interleaved to different detectors, so that successively excited picture elements are respectively allocated to a different detector. Because the light emitting diodes in this system are individually driven, the problem of the power of the emitted light is also present, for a prescribed scan time.

SUMMARY OF THE INVENTION

It is an object of the present invention to provide a read-out system for a luminescent storage screen of an x-ray diagnostics installation wherein the storage screen is scanned without mechanical deflection of the scan beam, and with an optimum exploitation of the stored energy for a prescribed scan time.

The above object is achieved in accordance with the principles of the present invention in a read-out system having a control circuit connected to a bank of light emitting diodes, with the light emitting diodes being individually coupled to picture elements, such as those in a line, of the storage screen. The control circuit multiply drives the light emitting diodes for each picture element, so that a plurality of light diodes are simultaneously energized in succession in different groups. A corresponding plurality of picture elements on the storage screen are thus excited and caused to emit light. The emitted light is collected and detected and converted into an electrical signal. The electrical signal is supplied to a calculating circuit which calculates brightness values for each picture element from the brightness signals corresponding to a plurality of picture elements. A plurality of picture elements can be simultaneously stimulated by driving the light emitting diodes in this fashion, without a complicated mechanical-optic deflecting means, so that a rapid read-out with a high signal level is obtained. The topical information of the individual picture elements is restored by the calculating circuit.

In a preferred embodiment, the drive of the light emitting diodes is undertaken in a coded fashion on the basis of a transformation, so that transformation coefficients are obtained in the read-out of the picture elements. The calculating circuit recovers the brightness values for each picture element of a line using these transformation coefficients by reverse transformation. The Hadamard-Walsh transformation is preferably used.

A simple structure is obtained in an embodiment wherein the light emitting diodes are directly optically coupled to the luminescent storage screen. A better adaptation of the area of the light-emitting diode to the area of the line on the storage screen to be scanned can be achieved by making the optical coupling using fiber optics. A line scan is obtained by arranging the light emitting diodes in a straight line bank, with a fiber optic coupling of each light emitting diode to a corresponding picture element.

DESCRIPTION OF THE DRAWINGS

FIG. 1 is a schematic diagram of an x-ray diagnostics installation having a detector screen which can be read-out in accordance with the principles of the present invention.

FIG. 2 is a block diagram of a read-out system for an x-ray diagnostics installation constructed in accordance with the principles of the present invention.

FIG. 3 is a table for explaining the drive of the light emitting diodes following a transformation in the read-out system of FIG. 2.

DESCRIPTION OF THE PREFERRED EMBODIMENTS

An x-ray diagnostics installation of a known construction is shown in FIG. 1. The installation includes a high voltage supply 21 which feeds an x-ray source 22, which emits x-rays which penetrate an examination subject 23. X-rays attenuated by the examination subject 23 are incident on a luminescent storage screen 24. The incident radiation on the screen 24 generates electrons which are stored in potential traps, so that a latent image is stored in the screen after irradiation by the x-rays.

A read-out system for the storage screen 24 is shown in FIG. 2. The storage screen 24 is scanned by a stimulation radiation source 25, which causes the electrons stored in the traps to be excited and fall back to lower energy levels, with the energy difference between the levels being emitted in the form of light quanta. The emitted light is detected, by means of which a visual image of the stored x-ray image can be obtained.

In accordance with the principles of the present invention, the radiation source 25 consists of a plurality of light emitting diodes 26 arranged in a line side-by-side. The light emitting diodes are individually coupled, via respective fiber optics 27, to allocated picture elements in a line of the storage screen 24 which is to be scanned. The light emitted by the scanned line is collected by a light collector and conductor 28, and is channeled to a detector 29. The detector 29 converts the brightness of the scanned picture elements into an electrical signal, which is supplied to a calculating stage 30, described in greater detail below, which generates a video signal for portrayal on a display 31 from the analog output signals of the detector 29.

A control unit 32 controls the synchronization and drive of the light emitting diodes 26 of the radiation source 25, the calculating stage 30, and the display 31. The calculating stage 30 contains known image memories, processing circuits and transducers. The calculating stage 30 also contains, in a departure from known systems, a computer which, as described in detail below, converts the electrical signals from the light detector 29 into brightness values allocated to the picture elements.

Light emitting didoes arranged in a line on a semiconductor chip can be used as the light emitting diodes 26. For example, four thousand light emitting diodes may be so arranged. The entire line can be scanned pixel-by-pixel by such light emitting diodes without mechanical motion. The luminence of an integrated light emitting diode is, however, several orders of magnitude less than a corresponding laser radiation source. This problem is overcome by driving the light emitting diodes 26 in selected combinations, rather than in succession. For example, at least half of the light emitting diodes 26 may be energized at a time, and a plurality of measurements, corresponding to different configurations of the activated light emitting diodes 26, can be made for each scan line. This permits the parallel read-out of an entire image line. It is thus not the information of an individual picture element which read-out, but instead transformation coefficients are measured, from which the actual picture element luminescence for each line can be obtained by data processing in the aforementioned computer. The method is fundamentally similar to Fourier transformation. In contrast thereto, however, binary or tertiary transformations are suitable such as, for example, Hadamard-Walsh transformation or Haar transformation.

A read-out sequence for light emitting diodes, numbered 11 through 18, which are driven according to a Hadamard-Walsh transformation is shown in FIG. 3. A sequence of measuring steps undertaken with increasing time t is indicated in a vertical direction in FIG. 3. In a first measuring step 1, all eight light emitting diodes 11 through 18 are energized. The light detector 29 acquires the sum information of the entire scanned line, which is entered into a memory contained in the calculating stage 30. In a second measuring step at a point in time $t=2$, the storage screen 24 is stimulated by every other light emitting diode 26. This is indicated in the second horizontal of FIG. 3, wherein diodes identified with a solid circle are energized, and those diodes identified with an empty circle are not energized.

In the further measuring steps, the light emitting diodes 11 through 18 are driven corresponding to points in time $t=3$ through $t=8$. For each measuring step, the light emitted by the storage screen 24 is acquired by the detector 29, and is converted into a digital signal and stored in the calculating stage 30. From the measured values obtained in this fashion, which correspond to transformation coefficients, a reverse transformation can reconstruct the light distribution in the entire line pixel-by-pixel.

Because a portion of the information is quenched upon read-out, as is known for stimulable phosphors, the measured values must be corrected according to the read-out depth before the reconstruction. A simple correction is obtained by undertaking additional measuring steps 2' through 8', inserted between the measuring steps 2 through 8. The measuring steps 2' through 8' are inverse with respect to the corresponding non-primed steps, so that the light emitting diodes which were energized in measuring steps 2 through 8 are not energized in steps 2' through 8', and those light emitting diodes which were not illuminated in measuring steps 2 through 8 are driven in measuring steps 2' through 8'. The sum of the allocated measuring steps 2 and 2', 3 and 3', etc. must be corrected so that a constant value corresponding to measuring step 1 results. The measuring precision is enhanced by approximately a factor of two in this manner.

The advantage of the read-out system is the substantially reduced mechanical outlay, since only a mechanical feed of the stimulable luminescent screen 24 is needed, as indicated by the arrow in FIG. 2. More importantly a laser is not required for the read-out. Because half of the light emitting diodes 16 are always energized, a high luminosity light signal can be generated as a sum of the light emitted by the individual light emitting diodes, while maintaining an extremely low light power for each diode. The energy expended per picture element in this measuring system is T/2 times the power of the individual diodes. If an embodiment of a light emitting diode line consisting of two thousand light emitting diodes is considered, the demand of the required light power of an individual diode is thus reduced by a factor of one thousand. If only measuring steps 1 through 8 are considered, the entire measuring time is no longer than the known sequential, pixel-by-pixel read-out.

Although modifications and changes may be suggested by those skilled in the art, it is the intention of the inventor to embodiment within the patent warranted hereon all changes and modifications as reasonably and properly come within the scope of their contribution to the art.

I claim as my invention:

1. A read-out system for a luminescent storage screen in an x-ray diagnostics installation wherein a latent x-ray image is stored in said luminescent storage screen divided into a plurality of pixels, said system comprising:
    a bank of side-by-side light emitting diodes for scanning pixels of said luminescent storage screen by irradiating said storage screen with stimulating radiation, each light emitting diode being associated with a pixel of said luminescent storage screen;
    means for driving said light emitting diodes in a succession of different groups so that different groups of pixels of said storage screen are successively stimulated to emit light;
    means for detecting the light emitted by each group of stimulated pixels of said storage screen and for generating an electrical brightness signal corresponding to the sum of the light from each of the stimulated pixels in the group;
    means for calculating a brightness value for each individual pixel in a group from said sum; and
    means for generating a visual display of the latent image from the individual brightness values.

2. A read-out system as claimed in claim 1, wherein said means for driving said light emitting diodes is a means for driving said light emitting diodes coded by a mathematical transformation so that each sum of detected light is a transformation coefficient, and wherein said means for calculating brightness values is a means for calculating brightness values for each picture element from the transformation coefficient by reversing the mathematical transformation.

3. A read-out system as claimed in claim 2, wherein said means for driving said light emitting diodes is a means for driving said light emitting diodes coded based on the Hadamard-Walsh transformation, and wherein said means for calculating is a means for calculating the individual brightness values for each pixel of a line by reverse Hadamard-Walsh transformation.

4. A read-out system as claimed in claim 1, wherein said light emitting diodes are directly optically coupled to respective pixels of said luminescent storage screen.

5. A read-out system as claimed in claim 1, further comprising a plurality of fiber optics couplers corresponding in number to said plurality of light emitting diodes and respectively optically coupling each light emitting diode to a pixel of said luminescent storage screen.

6. A read-out system as claimed in claim 1, wherein said light emitting diodes are arranged side-by-side in a bank forming a line and further comprising means for optically coupling the pixels in a line of said storage screen to the respective light emitting diodes in said bank.

7. A method for reading out a luminescent storage screen in which an x-ray image is latently stored comprising the steps of:
    scanning said luminescent storage screen with stimulating radiation generated by a plurality of light emitting diodes optically coupled to said storage screen thereby causing pixels in said storage screen to emit light;
    driving said light emitting diodes in different groups so that different groups of pixels are caused to emit light;
    detecting the light emitted by the stimulated pixels to generate a sum signal of the light emitted by all stimulated pixels in a group;
    calculating an individual brightness value for each pixel in a group from said sum signal; and
    constructing and displaying a visual image of the latent image from the individual brightness values.

8. A method as claimed in claim 7, wherein the step of driving said light emitting diodes is further defined by driving said light emitting diodes in groups coded based on a mathematical transformation so that the sum signals of the emitted light correspond to transformation coefficients, and wherein the step of calculating individual brightness values is further defined by calculating individual brightness values from said transformation coefficient by reversing the mathematical transformation.

9. A method as claimed in claim 8, wherein said step of driving said light emitting diodes is further defined by driving said light emitting diodes coded based on the Hadamard-Walsh transformation, and wherein said step of calculating is further defined by calculating individual brightness values for each pixel from the transformation coefficients by reverse Hadamard-Walsh transformation.

10. A method as claimed in claim 6, wherein the step of scanning said luminescent storage screen is further defined by scanning said luminescent storage screen line-by-line.

* * * * *